United States Patent
Hadley et al.

(10) Patent No.: US 7,028,233 B2
(45) Date of Patent: Apr. 11, 2006

(54) CHARACTERISTIC IMAGE OF ELECTRICAL DATA BUS

(75) Inventors: Andrew Hadley, Colorado Springs, CO (US); Paul Smith, Colorado Springs, CO (US); Steven Olson, Fort Collins, CO (US); Jeffrey Whitt, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 484 days.

(21) Appl. No.: 10/337,076

(22) Filed: Jan. 3, 2003

(65) Prior Publication Data

US 2004/0133835 A1 Jul. 8, 2004

(51) Int. Cl.
*G06F 11/00* (2006.01)
(52) U.S. Cl. .................... 714/707; 714/819; 714/56
(58) Field of Classification Search ............ 714/707, 714/43, 25, 56, 44, 45, 46, 47, 48, 54, 57
See application file for complete search history.

(56) References Cited

U.S. PATENT DOCUMENTS

| | | | | |
|---|---|---|---|---|
| 5,440,722 A | * | 8/1995 | VanderSpek et al. | 714/43 |
| 5,630,048 A | * | 5/1997 | La Joie et al. | 714/25 |
| 5,729,678 A | * | 3/1998 | Hunt et al. | 714/43 |
| 5,809,226 A | * | 9/1998 | Baldwin et al. | 714/43 |
| 5,978,934 A | * | 11/1999 | Gates | 714/41 |
| 6,341,358 B1 | * | 1/2002 | Bagg et al. | 714/43 |
| 6,850,852 B1 | * | 2/2005 | Ferguson et al. | 702/67 |

* cited by examiner

*Primary Examiner*—Albert DeCady
*Assistant Examiner*—Fritz Alphonse
(74) *Attorney, Agent, or Firm*—Cochran Freund & Young LLC

(57) ABSTRACT

A data stream is transferred through a parallel data bus while the read or write strobe is adjusted. The resultant data is compared to the original data to detect errors with each data line of the parallel bus. The results are displayed on a grid whereby the characteristics of each line of the data bus may be visually understood. The characteristic image of the performance of the data bus may be used for debugging the bus, as well as for other uses wherein the performance is very highly characterized.

20 Claims, 3 Drawing Sheets

Data Bus Bits 204

| Strobe Offset 202 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0.5 | 85 | 78 | 65 | 34 | 40 | 35 | 56 | 67 | 78 | 84 | 56 | 45 | 23 | 45 | 65 | 78 |
| 0.4 | 62 | 22 | 4 | 5 | 2 | 26 | 42 | 58 | 54 | 65 | 29 | 21 | 9 | 11 | 32 | 45 |
| 0.3 | 25 | 2 |  | 3 | 23 | 13 | 28 | 52 | 37 | 43 | 19 | 14 |  | 2 | 5 | 19 |
| 0.2 | 10 |  |  | 4 |  | 6 | 16 | 43 | 19 | 21 | 6 | 3 |  |  |  | 4 |
| 0.1 | 3 |  |  |  |  |  | 5 | 36 | 6 | 11 | 1 |  |  |  |  |  |
| 0 |  |  |  |  |  |  |  | 23 |  | 4 |  |  |  |  |  |  |
| -0.1 |  |  |  |  |  |  |  | 18 |  |  |  |  |  |  |  |  |
| -0.2 |  |  |  |  |  |  |  | 7 |  |  |  |  |  |  |  |  |
| -0.3 |  |  |  |  |  |  |  | 2 |  |  |  |  |  |  |  |  |
| -0.4 |  |  |  |  |  |  |  |  |  |  |  |  |  |  |  |  |
| -0.5 |  |  |  |  |  |  |  |  |  |  |  |  |  |  |  |  |
| -0.6 |  |  |  |  |  |  |  |  |  |  |  |  |  |  |  |  |

200
Graphical Image of Data
Bus Performance

FIGURE 2

300
Graphical Image of Data Bus Performance

CHARACTERISTIC IMAGE OF ELECTRICAL DATA BUS

BACKGROUND OF THE INVENTION a. Field of the Invention

The present invention pertains to electrical data busses and specifically to characterizing the bus performance.

b. Description of the Background

Parallel data busses are ubiquitous in electronics and computers. In general, several data lines are read simultaneously on a specific interval known as a clock cycle. The values of the several data lines may then change for the next clock cycle. Typically, the data bits many change prior to the occurrence of the read event. If a data bit is changing during read event, an incorrect read event may occur, introducing errors into the data.

Not all of the data lines in a certain bus will turn on and off with the same timing as the other data lines. The causes may be the result of a difference in trace lengths, the amount of resistance or capacitance of the components attached to the data line, manufacturing differences, noise, crosstalk, or many other causes. As clock rates increase, electronics designers face increasing challenges in insuring that the data lines are in their proper state when the data lines are read.

It would therefore be advantageous to provide a system and method for characterizing a parallel data bus wherein the performance of the bus may be visualized. It would be further advantageous if the system and method were able to optimize performance of the bus.

SUMMARY OF THE INVENTION

The present invention overcomes the disadvantages and limitations of the prior art by providing a system and method for evaluating and characterizing the performance of a parallel data bus. An adjustable strobe for reading or writing on a parallel data bus is adjusted over a predetermined operating range of the data read strobe while data is passed through the bus and compared to the original data. Errors that are encountered on each data line are counted and saved. A visual image of the bus may be created from these errors. The system and method may be used to detect specific problems with the design of the bus, or may be used to characterize the bus for various purposes.

The present invention may therefore comprise a method for generating a visual image of the performance of a parallel electronic data bus comprising: presenting the parallel electronic data bus having a data strobe that is capable of being adjusted within a predetermined range; transferring a data pattern across the data bus; adjusting the data strobe incrementally across a predetermined range while the data pattern is transferred across the parallel electronic bus; determining if any errors occurred in the transferring of the data pattern; displaying the errors in a two dimensional graph, the graph having the strobe adjustment as a first axis and the individual lines of the parallel electronic data bus as a second axis.

The present invention may further comprise an analysis system for a parallel electronic data bus having an adjustable data read strobe comprising: a pattern generation routine adapted to generate at least one data pattern; a transmission routine adapted to transfer the data pattern across the parallel electronic data bus, adjust the data read strobe incrementally across a predetermined range while the data pattern is transferred across the parallel electronic bus, and determine if any errors occurred in the transferring of the data pattern; a display routine adapted to display the errors in a two dimensional graph, the graph having the strobe adjustment as a first axis and the individual lines of the parallel electronic data bus as a second axis.

The advantages of the present invention are that a parallel bus may be fully characterized with a graphical image that is able to visually identify problems with the bus. Further, the present invention may create a signature for the bus that may be useful for various purposes, including manufacturing defect tracking, revision tracking, and other purposes.

BRIEF DESCRIPTION OF THE DRAWINGS

In the drawings,

FIG. 2 is an illustration of an embodiment of the present invention of a first graphical image of the performance of a parallel data bus.

DETAILED DESCRIPTION OF THE INVENTION

Figure 1:
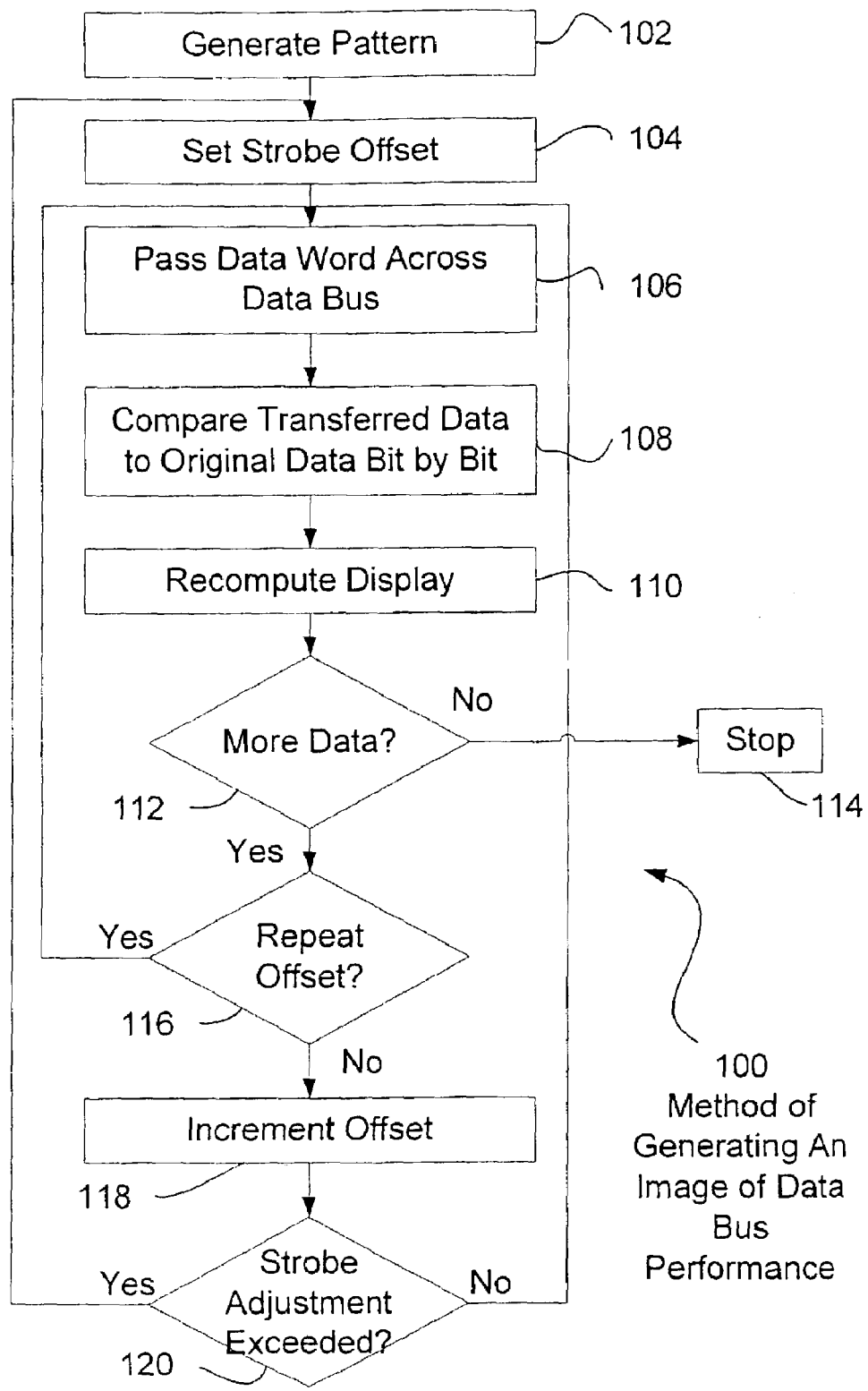
FIG. 1 is an illustration of a flow chart for an embodiment of the present invention of a method for creating a performance image of a parallel data bus.

FIG. 1 illustrates a flowchart for an embodiment of general method 100 for creating a performance image of a parallel data bus. A data pattern is generated in block 102, then the strobe offset is set to a predetermined value in block 104. A single word is passed across the data bus in block 106 and is read using the strobe offset. The transferred data is compared to the original data in block 108 and the display is recomputed in block 110. If no more data is to be transferred in block 112, the process halts in block 114. If another word is to be transferred at the current offset in block 116, the process returns to block 106. If the offset is to be changed, it is done so in block 118. If the strobe adjustment is exceeded in block 120, it is reset in block 104 otherwise another data word is passed across the bus in block 106.

The method 100 involves passing data across a parallel data bus and reading the data using a strobe that can be adjusted. The strobe may be adjusted earlier and later than the rise or fall edge of a clock signal by small amounts. Such amounts would depend on the performance of the specific data bus. By adjusting the strobe earlier or later in the reading process, certain characteristics of the data bus may be detected and displayed.

For example, if the read strobe is incrementally adjusted earlier and earlier, one or more data lines will begin to fail intermittently at first, and then continuously. Some data lines may fail at a smaller offset than other data lines. Those data lines may be the data lines with different length traces or may have other design characteristics that cause a distinctive pattern in the results. Such characteristics may be due to the components in line with the data signal as well as the layout of the circuitry. The strobe may likewise be adjusted later and later from a nominal point and similar effects may be witnessed.

The method 100 may be performed in real time, wherein the display is recomputed and shown to a user with each cycle of the process. In other cases, the data may be analyzed and a visual image displayed after the data are passed across the bus.

The patterns generated in block 102 may be any pattern. Examples of patterns include FF-00 patterns wherein every data line is toggled from high to low simultaneously, checkerboard patterns where the data switch from 10101010 to 01010101, random patterns, or any other pattern. Many such patterns are known in the art and may be used while keeping within the spirit and intent of the present invention. The use of different patterns may yield different visual images of the performance of the data bus, as discussed hereinafter.

Each increment of the strobe may have multiple data words transferred across the bus. For example, when the strobe offset is at a particular value, one, ten, one hundred, or several million words may be transferred to generate data. The number of repeated values may be adjustable by the user of the method 100.

The method 100 may be repeated continuously or through a prescribed number of times. In some cases, the method 100 may execute in real time, with a constantly updated display of the performance of the data bus. In other cases, the method 100 may be used with a predetermined pattern and performed a predetermined number of cycles to compare the performance of one data bus against a second data bus.

The comparison performed in block 108 comprises comparing each bit that is transferred across the data bus on a bit-by-bit basis. For example, if the data pattern included the value 10101010, and the value received was 00101010, the comparison of the original data patterns and the received data pattern had an error in the first data line. The results may be displayed on a grid wherein one axis of the grid contains each individual data line and the second axis contains the strobe offset.

FIG. 2 illustrates an embodiment 200 of a graphical image of the performance of a parallel data bus. The graphical chart has cells defined by a strobe offset axis 202 and the data bus bits axis 204. Each cell in the present embodiment has a number representing the number of errors of the particular combination of strobe offset and data bit. For example, for the strobe offset of −0.1 and data bit 8, 18 errors occurred.

The embodiment 200 gives a graphical picture of a measure of performance of the data bus. In the particular image 200, data bit 8 appears to be behaving substantially differently than the other bits. If the negative strobe offset represents a delay in the strobe, data bit 8 may be interpreted to be very late. A design engineer may use this information to investigate the various components attached to data bit 8. The engineer may also investigate the signal trace lengths of data bit 8 with respect to those of the other bits. In some cases, the engineer may be able to change the design so that the failures of data bit 8 are reduced, and thus changing the characteristic image 200 for that particular bus design.

The numbers in each cell may represent actual failures or may be normalized to a percentage of failures of all the data. In some embodiments, color may be used in lieu of or in addition to numbers to represent the relative severity of the errors that occur on each of the bits.

The present figure illustrates a parallel data bus of 16 bits. In other instances, the parallel data bus may have any number of bits, including 8 bits, 32 bits, 64 bits, etc. Bus widths of any size may be analyzed and displayed using the present invention while keeping within the spirit and intent of the present invention.

Figure 3:
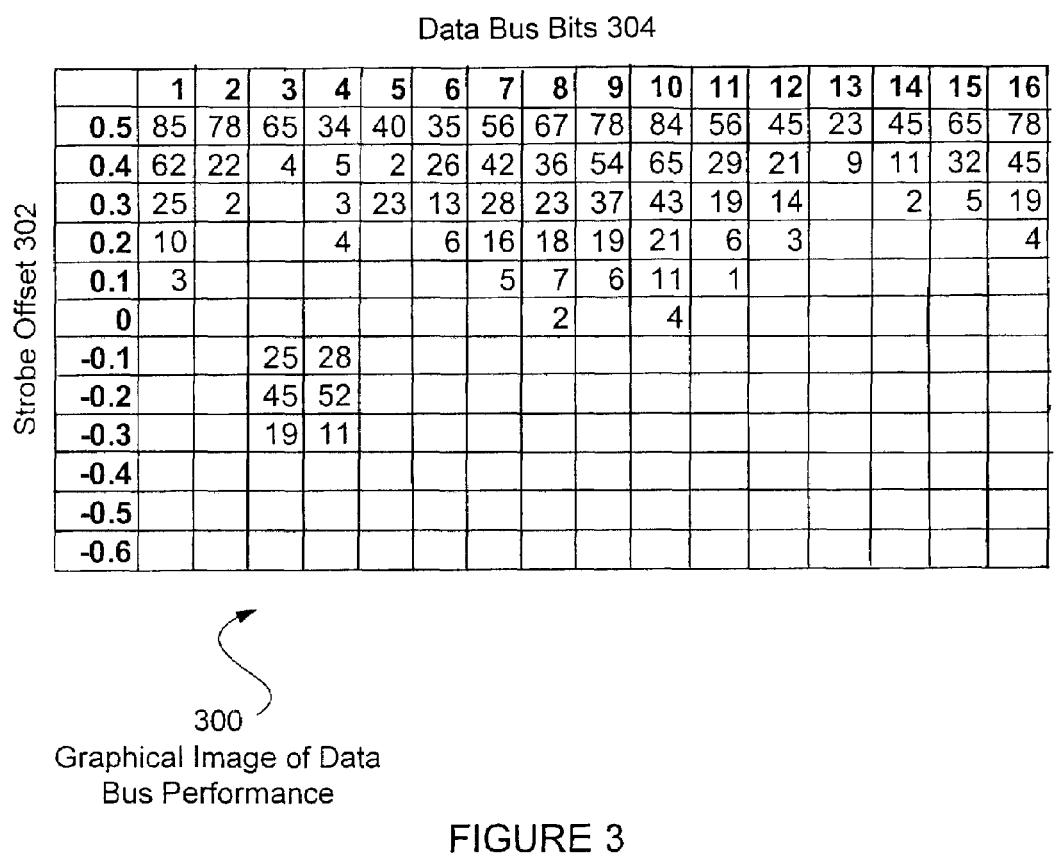
FIG. 3 is an illustration of an embodiment of the present invention of a second graphical image of the performance of a parallel data bus.

FIG. 3 illustrates an embodiment 300 of a graphical image of the performance of a parallel data bus. The graphical chart has cells defined by a strobe offset axis 302 and the data bus bits axis 304. Each cell in the present embodiment has a number representing the number of errors of the particular combination of strobe offset and data bit.

In FIG. 3, the strobe values of −0.1 to −0.3 on data bits 3 and 4 indicate that there may be some crosstalk present between the data bit lines 3 and 4. The crosstalk may occur when specific patterns are transferred across the data bus and not when other patterns are present.

The data patterns that are used to exercise the parallel data bus may cause the graphical image to display different characteristics. For example, when an FF-00 pattern is used, crosstalk would be difficult to identify but may give a better picture of the delays associated with trace length mismatches or other design effects. When a random pattern is used, crosstalk may be easier to identify. Those skilled in the arts may use the visual images to diagnose many different characteristics of a parallel data bus while keeping within the spirit and intent of the present invention.

The images 200 and 300 may be characteristic of a specific data bus as it is implemented on a specific revision of a printed circuit board, integrated circuit, or hard-wired circuit. The characteristic image may be used to identify the specific revision of a printed circuit board or integrated circuit. The characteristic image may be used by quality control as a thorough functional check, as any missing, broken, or damaged component in the data transmission line would cause the image to be drastically changed.

Another application of the present invention is to determine the optimum strobe offset that would guarantee error free transmission. In the example of FIG. 2, a strobe offset value of −0.5 may be a setting whereby all of the data bits operate correctly.

Throughout the present specification, the term 'read strobe' has been used to illustrate the present invention. Those skilled in the arts will appreciate that the principles of the present invention may be applied to the write strobe of a parallel data bus, and therefore the present invention may encompass adjusting either the read strobe or write strobe.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method analyzing the performance of a parallel electronic data bus comprising:

generating at least one digital data pattern, said digital data pattern being a pattern of digital data bits that have values of either one or zero;

applying said digital data pattern to said parallel electronic data bus;

using an adjustable data strobe to capture a set of said digital data bits on said parallel electronic data bus before and after a transitional edge of an electronic data bus transmission clock cycle;

adjusting a data strobe offset to capture said digital data bits while said digital data pattern is transferred across said parallel electronic bus;

comparing said digital data bits captured by said data strobe to said digital data pattern;

identifying errors whenever said digital data bits do not match said digital data pattern; and displaying a two dimensional graph, said graph having cells delineated by an intersection of said data strobe offset on a first axis and a bit identifier specifying said digital data bits of said digital data pattern on a second axis, such that each cell of said graph displays a representation of an accumulation of said errors for said strobe adjustment offset.

2. The method of claim 1 wherein said representation of said accumulation of said errors is a percentage of said errors out of a total count of each said digital data pattern transferred.

3. The method of claim 2 wherein said percentage is displayed with a number.

4. The method of claim 2 wherein said percentage is displayed by a color.

5. The method of claim 1 wherein said steps are performed in real time.

6. The method of claim 1 wherein said digital data pattern is a predetermined binary pattern of ones and zeros in an alternating hex FF-00 series.

7. The method of claim 1 wherein said digital data pattern is a predetermined binary pattern of ones and zeros in a checkerboard pattern.

8. The method of claim 1 wherein said digital data pattern is a random set of ones and zeros.

9. The method of claim 1 wherein said data strobe is a data read strobe.

10. The method of claim 1 wherein said data strobe is a data write strobe.

11. An analysis system for a parallel electronic data bus comprising:

an adjustable data strobe that captures a digital data pattern being transferred on said parallel electronic data bus before and after a transitional edge of an electronic data bus transmission clock cycle, said digital data pattern being a pattern of digital data bits that have values of either one or zero;

a pattern generation routine that generates said digital data pattern;

a transmission routine that applies said digital data pattern to said parallel electronic data bus;

a strobe adjustment routine that adjusts a data strobe offset to capture said digital data bits while said digital data pattern is transferred across said parallel electronic data bus;

a comparison routine that compares said digital data bits captured by said data strobe to said digital data pattern;

an error identification routine that identifies errors whenever said digital data bits do not match said digital data pattern; and a display errors routine that displays a two dimensional graph, said graph having cells delineated by an intersection of said data strobe offset on a first axis and a bit identifier specifying said digital data bits of said digital data pattern on a second axis, such that each cell of said graph displays a representation of an accumulation of said errors for said strobe adjustment offset.

12. The analysis system of claim 11 wherein said representation of said accumulation of said errors is a percentage of said errors out of a total count of each said digital data pattern transferred.

13. The analysis system of claim 12 wherein said percentage is displayed with a number.

14. The analysis system of claim 12 wherein said percentage is displayed by a color.

15. The analysis system of claim 11 wherein said analysis system operates in real time.

16. The analysis system of claim 11 wherein said digital data pattern is a predetermined binary pattern of ones and zeros in an alternating hex FF-00 series.

17. The analysis system of claim 11 wherein said digital data pattern is a predetermined binary pattern of ones and zeros in a checkerboard pattern.

18. The analysis system of claim 11 wherein said digital data pattern is a random set of ones and zeros.

19. The analysis system of claim 11 wherein said data strobe is a data read strobe.

20. The analysis system of claim 11 wherein said data strobe is a data write strobe.

* * * * *